UNITED STATES PATENT OFFICE.

JOSEPHUS W. CURRY, OF BEDA, KENTUCKY.

COFFEE SURROGATE.

SPECIFICATION forming part of Letters Patent No. 544,059, dated August 6, 1895.

Application filed June 8, 1895. Serial No. 552,088. (No specimens.)

*To all whom it may concern:*

Be it known that I, JOSEPHUS W. CURRY, a citizen of the United States, residing at Beda, in the county of Ohio and State of Kentucky, have invented a new and useful Coffee Compound, of which the following is a specification.

My invention relates to a coffee compound adapted as a substitute for coffee, the objects in view being to provide a compound having the flavor and general effects of coffee, which may be manufactured and sold at less than the cost of coffee, and which will not produce the deleterious effect on the nerves and liver which is the result of the use of coffee.

The compound embodying my invention comprises coffee, (preferably Rio,) one and one-fourth pounds; rye, three pounds; licorice, (extract,) one-half ounce; sugar, (granulated,) one ounce; white of egg, four eggs; dandelion, (fluid extract,) sixty drops.

In preparing and combining the above ingredients, the rye and coffee are washed separately and all imperfect grains are removed, after which the rye and coffee are browned or roasted separately. The licorice is dissolved in warm water. The white of egg is beaten to a froth and the sugar and dandelion stirred into the egg, after which the egg, sugar, and dandelion are added to the licorice and thoroughly mixed. The liquid thus formed and while warm is poured over the rye, and is stirred and rubbed through the latter until the grain is thoroughly coated, after which the rye is again heated and subsequently allowed to cool and dry. The final operation is the grinding of the coffee and rye and mixing them thoroughly.

The licorice produces the laxative effect and furnishes the coloring-matter and flavor, while the dandelion has the property of stimulating digestion and stimulating the liver to a greater extent than coffee. Said dandelion also adds to the flavor and causes it to closely resemble that of pure coffee.

The egg employed in the compound is designed to cause the coffee to settle, as in the ordinary use of egg in coffee, but in addition to this the egg is nourishing, and therefore adds to the nutritive properties of the coffee, and in the operation of combining the ingredients the use of egg is important in that it causes the licorice and dandelion to adhere to the rye.

The rye which comprises the principal ingredient of the compound is cheaper than coffee, and by the preparation above described receives the flavor and is invested with the properties of coffee without having the effect upon the nervous system that is produced by the use of coffee.

The coffee is employed in the compound in order to still further add to the flavor and secure a more perfect resemblance to the pure article.

Having described my invention, what I claim is—

A substitute for coffee including rye, extract of licorice, sugar, white of egg and fluid extract of dandelion, in substantially the proportions specified.

In testimony that I claim the foregoing as my own I have hereto affixed my signature in the presence of two witnesses.

JOSEPHUS W. CURRY.

Witnesses:
WILLIAM C. BENNETT,
WILLIAM Q. PARKS.